United States Patent [19]

West, Jr.

[11] Patent Number: 5,345,504
[45] Date of Patent: Sep. 6, 1994

[54] DIFFERENTIAL COMPENSATION CONTROL FOR OFF-PREMISES CATV SYSTEM

[75] Inventor: Lamar E. West, Jr., Maysville, Ga.

[73] Assignee: Scientific-Atlanta, Inc., Atlanta, Ga.

[21] Appl. No.: 619,370

[22] Filed: Nov. 28, 1990

Related U.S. Application Data

[63] Continuation-in-part of Ser. No. 446,603, Dec. 6, 1989, Pat. No. 5,208,854, which is a continuation-in-part of Ser. No. 166,302, Mar. 10, 1988, Pat. No. 4,912,760, and a continuation-in-part of Ser. No. 279,619, Dec. 5, 1988, Pat. No. 5,014,309.

[51] Int. Cl.$^5$ .................................... H04N 7/167
[52] U.S. Cl. .................................... 380/7; 348/6; 455/3.1; 455/233.1; 455/234.1; 455/239.1; 455/240.1; 455/246.1
[58] Field of Search ............... 380/7; 358/86, 349, 358/175; 455/1, 3, 4, 234, 239, 240, 248, 246, 3.1–3.3, 4.1–4.2, 234.1–234.2, 239.1, 240.1, 246.1, 248.1, 233.1

[56] References Cited

U.S. PATENT DOCUMENTS

| | | | |
|---|---|---|---|
| 2,777,994 | 1/1957 | Hurault | 333/16 |
| 3,755,737 | 8/1973 | Eller | 455/70 |
| 3,806,814 | 4/1974 | Forbes | 455/4 |
| 4,024,575 | 5/1977 | Harney et al. | 380/7 |
| 4,039,954 | 8/1977 | den Toonder | 455/1 |
| 4,225,976 | 9/1980 | Osborne et al. | 455/226 |
| 4,245,245 | 1/1981 | Matsumoto et al. | 380/7 |
| 4,367,557 | 1/1983 | Stern et al. | 455/4 |
| 4,418,424 | 11/1983 | Kawamoto et al. | 455/4 |
| 4,450,481 | 5/1984 | Dickinson | 380/7 |
| 4,769,838 | 9/1988 | Hasegawa | 380/7 |
| 4,827,511 | 5/1989 | Masuko | 380/15 |
| 4,829,593 | 5/1989 | Hara | 455/234 |
| 4,912,760 | 3/1990 | West, Jr. et al. | 380/7 |
| 4,967,169 | 10/1990 | Sun et al. | 333/28 R |
| 5,014,309 | 5/1991 | West, Jr. | 380/7 |

FOREIGN PATENT DOCUMENTS

| | | | |
|---|---|---|---|
| 58-43608 | 3/1983 | Japan | 333/28 R |
| 495815 | 11/1938 | United Kingdom | 333/28 R |

Primary Examiner—Bernarr E. Gregory
Attorney, Agent, or Firm—Banner, Birch, McKie & Beckett

[57] ABSTRACT

A off-premises CATV system includes a compensation control including a picture carrier controlled automatic gain control and an automatic slope control. A broadband television signal output from a variable gain device is distributed by a radio frequency signal splitter to a number of subscribers interdiction. The variable gain device and a variable frequency dependent device are connected in series for automatic gain control and automatic slope control, respectively. A first feedback control is used to compare a first portion of the broadband television signal to a reference power level and null the error. A second feedback control is used to compare a second portion of the broadband signal to the first portion and null the error. A second embodiment of the second feedback control differences the first and second portions of the broadband television signal. The first predetermined portion is a band of frequencies (high band) between 250 MHz. and 310 MHz. and the second predetermined portion is a band of frequencies (low band) between 54 MHz. and 150 MHz. The predetermined power level reference for automatic gain control is set to equal the attenuation between the off-premises equipment and the subscriber premises plus the desired level at the subscriber premises. The power level of a jamming signal for denying access to unauthorized television programs is set to fall within a predetermined range of power levels related to the predetermined power level reference.

10 Claims, 8 Drawing Sheets

DIFFERENTIAL COMPENSATION CONTROL FOR OFF-PREMISES CATV SYSTEM

CROSS-REFERENCE TO RELATED APPLICATIONS

This application is a continuation-in-part of U.S. Patent Application Ser. No. 446,603, filed Dec. 6, 1989, now U.S. Pat. No. 5,208,854, which itself is a continuation-in-part of U.S. Patent Application Ser. No. 166,302, filed Mar. 10, 1988, now U.S. Pat. No. 4,912,760, and also a continuation-in-part of U.S. application Ser. No. 279,619, filed Dec. 5, 1988, entitled "Off-Premises Cable Television Channel Interdiction Method and Apparatus, now U.S. Pat. No. 5,014,309.

FIELD OF THE INVENTION

The invention relates to cable television (CATV) channel interdiction systems and, more particularly, to a method and apparatus for automatically controlling the gain and slope compensation in such systems.

BACKGROUND OF THE INVENTION

In the past, a scrambler has been provided to encode premium television channels at a headend of a cable television system. The applied scrambling precluded reception by an unauthorized converter/decoder at a connected premises. Data representing the channels or tiers of programming to which the subscriber was entitled were addressably transmitted to a particular converter/decoder and stored in an authorization memory. As a result of the addressed transmission, a subsequently transmitted program would be authorized by selectively enabling the decoder portion of the converter/decoder to decode the scrambled premium channel or program.

The provision of one scrambler per premium channel at the headend and the inclusion of a descrambler in each converter/decoder at the premises of the television receiver was particularly expensive. Furthermore, providing a converter/decoder on premises has turned out to be a great temptation to service pirates who imaginatively seek ways to receive premium channels. As a result, cable television equipment manufacturers have entered into a veritable war with such pirates resulting in complicated service authorization protocols, which in some instances involve multiple layers of encryption by both in-band and out-of-band data transmissions thereby further increasing the costs of the converter/decoder. In addition, scrambling systems may leave artifacts in the final signal.

Consequently, the cable industry has reviewed other technology developed in the early stages of cable television, such as the application of negative and positive traps, and more recent techniques, such as interdiction, to improve CATV systems.

Negative trap technology is viewed by many manufacturers as a viable alternative to scrambling methods. A negative trap is basically a narrow band rejection filter. Traps are located at the drop to a subscriber's dwelling and attenuate a significant portion of a premium television channel rendering that channel unusable by the subscriber. Recently, a new type of negative trap has been introduced. The dynamic negative trap consists of a notch filter that is designed to be modulated with respect to frequency. The notch is centered about the picture carrier but is deviated slightly from side to side. The television channel is rendered unusable by the attenuation and by the introduction of unwanted amplitude and phase modulation of the picture carrier.

Positive trap systems also utilize a narrow band rejection notch filter. However, unlike negative trap systems which are used to attenuate or trap a premium channel transmission, the notch filter is used to restore the premium television channel. In this scenario, an interfering signal is placed on the premium television channel at the cable television headend. This interfering signal is then removed at the subscriber by the use of the notch filter. Ideally, this notch filter removes only the interference without removing a significant amount of the television information.

Parallel to developments of different types of trapping and jamming systems, the cable industry has also evidenced a requirement to move a converter/decoder outside of a subscriber's home to a location which is more secure from signal piracy. For example, an addressable tap system was developed by Scientific Atlanta in which an off-premises "tap", addressed by a headend control system, controlled premium channel series into the subscriber's premises. However, such addressable taps did not prove to be viable alternative to the inside-the-home signal converter/decoder.

A relatively recent technique for premium channel control is the interdiction system, so called because of the introduction of an interfering signal into a premium channel at the subscriber's location. Most embodiments consist of a pole-mounted enclosure located outside the subscriber's premises designed to serve one or more subscribers. This enclosure contains at least one microprocessor controlled oscillator and switch control electronics to secure several television channels. Control is accomplished by injecting an interfering or jamming signal into unauthorized channels from this pole-mounted enclosure.

For the sake of efficiency, it is known to utilize one oscillator to jam several premium television channels. This technique not only reduces the amount of hardware required, but also maximizes the system flexibility. The jamming signal frequency is moved as a function of time from channel to channel. The oscillator is frequency agile and hops from jamming one premium channel frequency to the next. Cable television channels and, of course, premium service channels may extend over a wide range of frequencies, for example, from 54 MHz. to 550 MHz. Thus, if only one oscillator is provided, it must be frequency agile over a wide range.

One such system is known from U.S. Pat. No. 4,450,481 in which a single frequency agile oscillator provides a hopping gain-controlled jamming signal output to four high frequency electronic switches. In this system, each switch is associated with one subscriber drop. Under microprocessor control and depending on which subscribers are authorized to receive transmitted premium programming, the microprocessor selectively gates the jamming signal output of the single oscillator via the switches into the path of the incoming broadband television signal to each subscriber. Consequently, an unauthorized subscriber upon tuning to a premium channel will receive the premium channel on which a jamming signal at approximately the same frequency has been superimposed.

It is indicated that the jamming signal is at a high relative power and is gain controlled to exceed the amplitude of the video carrier by 5 to 20 dB. Because of the high output power relative to the premium channel video carrier power and the difficulty of precisely jamming the premium channel frequency, such an interdiction system leaves considerable opportunity for improvement. Because the oscillator is frequency hopping, its spectrum tends to spread out around the picture carrier, generating a slightly different situation as far as the required adjacent channel rejection characteristics of the television signal is concerned.

Additionally, it is important in an interdiction system that the jamming signal be properly matched in level with the picture carrier level of an interdicted channel. Furthermore, this match is important not only to compensate for drift in the components due to temperature variations and seasonal weather changes but to also compensate for level variations due to its location in a CATV distribution plant and to compensate for tilt due to imperfect gain requirements of a distribution cable over the frequency spectrum. Otherwise, adjacent channel artifacts or incomplete jamming will result. In the previous system, conventional gain sensing and control circuits are used for gain control to compensate only for the simplest of variations.

Not only in conventional interdiction systems but also in accordance with grandparent application U.S. Ser. No. 07/279,619, now U.S. Pat. No. 5,014,309, the jamming carrier level was matched to the incoming picture carrier level. In that application, it was suggested to improve gain control by sampling the picture carriers at the high and low ends of the frequency spectrum at pilot frequencies so as to be better prepared to regulate the jamming carrier amplitude level to match the level of the incoming picture carrier. Furthermore, it was suggested that a slope characteristic for the particular cable distribution plant could be downloaded to an interdiction unit in the vicinity of the subscriber for improved frequency compensation control.

In a normal CATV subscriber installation, regardless of whether negative trap, positive trap or interdiction is applied, the picture carrier signal level can be expected to vary by several decibels over time and temperature. This variance may result from losses in the distribution cable, errors in the automatic gain control circuits of distribution amplifiers, aging of electronic components, and other effects.

From CATV distribution amplifiers operating on trunk lines, it is known to sense the level of a picture carrier after a variable gain element and adjust the gain of the variable gain element until the picture carrier level sensed is equal to a predetermined reference level established by the configuration of the cable distribution plant. Consequently, while controlling the gain of a picture carrier is known from the design of cable distribution systems, no previous consideration was given to controlling the gain of a picture carrier in a jamming or interdiction system at a subscriber.

Typically, in the conventional systems previously alluded to, the gain control for matching the jamming carrier level to the incoming picture carrier level is carried out on a persubscriber basis. This is a costly procedure, and there remains a requirement to reduce costs wherever possible without jeopardizing the quality of any television signal received at a customer's premises.

In parent application U.S. Ser. No. 446,603 it is disclosed that a more advantageous method of compensating for cable distribution plant characteristics and home installation variations for an off-premises CATV system is to control the picture carrier level with respect to the jamming carrier level. This provides a predetermined relationship between the picture carrier level and the jamming carrier level without the necessity of addressing individual subscriber installations. Moreover, in the parent application there is taught that automatic gain control of the picture carrier level can be accomplished by measuring the broadband television signal power level with a bandpass filter. This reduces the cost of the circuitry which is an important consideration for subscriber equipment.

With respect to the tilt correction in this system, a fixed network was utilized. This required that installation personnel measure the characteristics of the cable distribution plant at the particular location and select the correct values for the network. While providing substantial tilt correction, this method produces uneven results because of the human errors in making a relatively difficult measurement and selecting the correct components to install.

It would be advantageous to provide an automatic slope control circuit for an interdiction apparatus. Prior automatic compensation circuits for trunk amplifiers have used two pilot frequencies to determine the amount of compensation for a broadband television signal. A pilot frequency on one end of the CATV band is measured to control gain and a second pilot frequency on the other end of the band is measured to control slope. This circuit requires relatively expensive bandpass filters for the measurement of the pilot frequencies and further requires that the filters be set to detect frequencies which are always present. The cable operator must always present a carrier on the chosen channel. While this is not too burdensome when talking about trunk amplifiers where the per unit cost can be relatively large because there are so few of them, it becomes much more of a problem when providing an automatic slope control for interdiction apparatus because of the number of units. This problem will increase with the growing popularity of interdiction units for single subscribers where one automatic control per premises is needed.

In copending application Ser. No. 07/619,261, filed Nov. 28, 1990, now U.S. Pat. No. 5,231,660, there is described an automatic compensation control for an off-premises CATV system which has an automatic gain control controlled by the output of a high bandpass filter and an automatic slope control regulated by the output of a low bandpass filter. While this control is advantageous in an off premises CATV system, its control loops are coupled together and thus their response could be improved to limit hunting. The increase in response should preferably be without increased cost for the control system.

Consequently, prior to the present invention, the need remained for improved compensation in off-premises control systems which alleviate the effects of cable distribution plant characteristics in view of variations in home installations. Furthermore, any such automatic compensation control should be provided in a cost-effective manner without jeopardizing signal quality.

SUMMARY OF THE INVENTION

Therefore, is an object of the invention to provide an improved automatic compensation control for an off-premises CATV system.

It is another object of the invention to provide an efficient, cost effective off-premises CATV system with improved automatic frequency compensation.

It is a further object of the invention to provide an improved off-premises CATV system with an automatic compensation control including combined automatic gain control and automatic slope control.

It is yet another object of the invention to provide automatic frequency compensation by detecting a band or group of contiguous channel carriers.

It is a further object of the invention to provide improved automatic gain control and automatic slope control which takes into consideration variations in cable distribution plant for changes due to location, time and temperature.

The invention provides an automatic compensation control which varies a broadband television signal for amplitude level control and frequency compensation. The automatic compensation control includes in a preferred implementation an automatic gain control for amplitude level control and an automatic slope control for frequency compensation.

In accordance with the invention, an off-premises CATV system is utilized to interdict premium television channels by introducing jamming signals into them from a site at or near the subscriber premises. Because it is advantageous to regulate the jamming carrier levels at a predetermined level, the incoming channel carriers are varied by the automatic gain control to maintain a substantially constant relationship between them and the jamming carrier levels. The level of the picture carriers is regulated so as to be equivalent to the result of adding an attenuation level inherent in a typical subscriber drop line to the level at the subscriber port, i.e., in a narrow range from 0 dBmv to +3 dBmv. (In the United States, a minimum 0 dBmv level is required at the subscriber premises under Federal Communication Commission regulations.)

Then, as first suggested in U.S. Pat. No. 4,912,760, the jamming signal level will be maintained within a predetermined range of −2.5 db and +6.5 db of the regulated picture channel carrier levels. In this manner, the effects from variations in the cable distribution plant over time and temperature and from variations in subscriber installations are all minimized.

In accordance with a still another embodiment of the invention, RF detectors of the automatic compensation control measure the level of the broadband television signal output from a variable gain device at both low and high frequency bands using a low bandpass filter and a high bandpass filter. The attenuation of the output of the variable gain device is controlled as a function of the output of the high bandpass filter. The slope compensation network is controlled in accordance with the detected difference of the output between the high-band pass filter and the low-band pass filter.

Furthermore, in accordance with the present invention, the automatic slope control is provided by sensing a band of frequencies comprising a plurality of contiguous channel carriers so that no adverse impact results from the absence of any one of the contiguous carriers. So long as at least one channel carrier is transmitted, adequate slope control results. This results in an inexpensive method for controlling frequency compensation by a bandpass filter. Also, the cable system operator is relieved of any requirement for assuring that a pilot channel carrier is transmitted.

As another feature of the invention, a voltage variable slope compensation network for automatic slope control is described. The equalization network produces a frequency dependent response across the broadband television signal range of the automatic compensation control while maximizing return loss.

These and other objects, features and aspects of the invention will be more clearly understood and better described if the following detailed description is read in conjunction with the appended drawings wherein:

DETAILED DESCRIPTION OF THE INVENTION

Now the automatic compensation control system and method of the invention will be discussed in the context of the off-premises cable television channel interdiction system first disclosed in U.S. Pat. No. 4,912,760, the disclosure of which is herein incorporated by reference. The present invention is in principle not limited to automatic compensation control circuitry for an interdiction system, but is also applicable to automatic compensation control circuits provided in any off-premises cable television system or in any other system at an off-premises location proximate to a subscriber premises in which the amplitude of a signal to be jammed must be closely matched to an amplitude of a jamming signal, and at a frequency close to that of the signal to be jammed.

Figure 1:
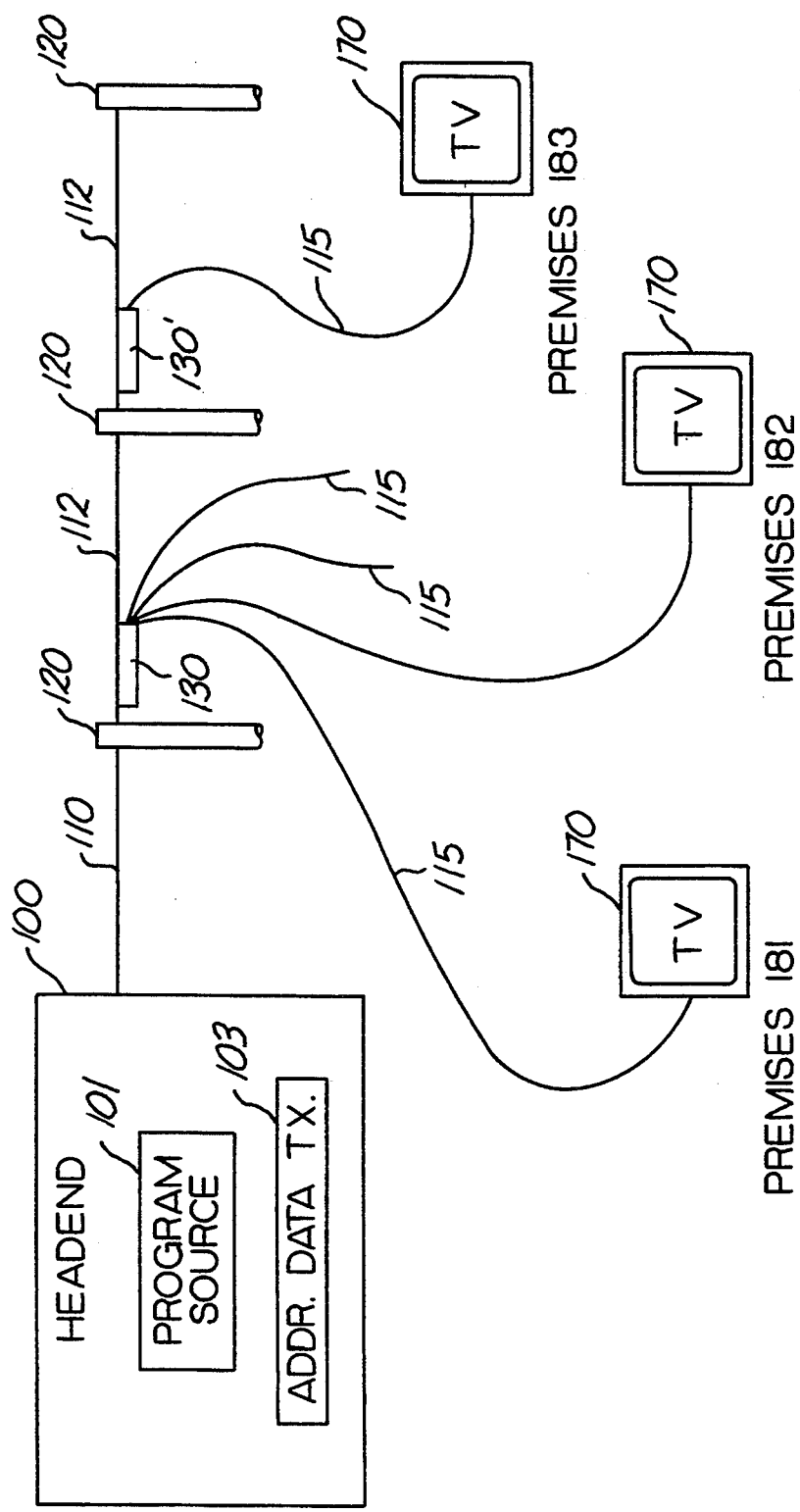
FIG. 1 is a system block diagram of an off-premises CATV system including an automatic compensation control constructed in accordance with the invention.

Referring more particularly to FIG. 1, there is shown a general block diagram of an off-premises CATV system employing the principles of the present invention.

The term cable television system is intended to mean all systems involving the transmission of television signals over a transmission medium (fiber optic cable or coaxial cable) toward remote locations. For example, a cable television system may comprise a community antenna television distribution system, a satellite signal distribution system, a broadcast television system, a private cable distribution network, either industrial or educational, or other forms of such systems. Each remote location of a television receiver may comprise the location of a particular subscriber to a subscription television service, plural subscribers, single subscribers having plural television receivers, or private subscribers in a private cable distribution network. Consequently, the term subscriber refers to either a private or a commercial user of a cable television system.

A headend 100 as used in the present application and claims is defined as the connecting point for distributing television channels. The channels are then distributed to a serving cables or trunks 110, over feeder lines 112 to drops 115 and finally to subscriber locations 181, 182, 183. For reference purposes, an Electronic Industries Association (E.I.A.) standard cable television frequency allocation scheme is employed and referred to herein; however, by means of the following disclosure of the present invention, one may apply the principles to other known standards or non-standard frequency allocations. Furthermore, a National Television Subcommittee (N.T.S.C.) standard composite television signal modulated on a radio frequency carrier is generally considered in the following description; however, the principles of the present invention apply equally to other standard and non-standard television signal formats.

Headend 100 comprises a source of television programming, program source 101. Television program source 101 may be a satellite television receiver output, a program produced by a television studio, program material received over a microwave or broadcast television link, a cable television link output, or any other source of television programming consistent with the present invention. The program source material need not be limited to conventional television but may comprise teletext, videotext, program audio, utility data, or other forms of communication to be delivered to a remote location over the serving cables or trunks line 110 and subsequently over the feeder lines 112 and the drop lines 115. Conventionally, the trunks 110, feeder lines 112, and drop lines 115 are constructed of coaxial cable. For higher performance, any one of these could be a fiber optic cable. Preferably, due to the cost of the installation and the need for a high quality initial transmission from the headend 100, the trunk lines 110 are typically the only line constructed of fiber optic cable.

Program material provided by source 101 may be premium or otherwise restricted or secured from receipt at unauthorized receiver locations. The use of the term premium channel or premium programming is intended to mean a channel or program which is desired to be secured from unauthorized receipt either because of its premium or restricted status. In the past, all premium programming in cable television systems has been scrambled. However, in accordance with the present interdiction system, premium programming is transmitted in the clear, and interdiction is applied by off-premises interdiction apparatus 130, 130', to jam reception of unauthorized premium programming. The interdiction apparatus can serve a single subscriber, such as 130'; or multiple subscribers, such as 130. While the interdiction apparatus is shown as proximate to feeder 112 int he drawings, it may also be located in the distribution plant, on the subscriber's premises, or at such other location as may be convenient.

Also, at the headend 100, there is normally an addressable data transmitter 103 for transmitting global commands and data to all subscribers, or local commands and data for reception by a unique subscriber. Such data transmissions may be conducted over a separate data carrier from the cable television spectrum, for example, at 108.2 MHz. Global commands generally take the form of operation codes and data while local communications further comprise the unique address of a particular subscriber. Alternatively, such communications may take the form of in band signals sent with a television channel superimposed upon an audio carrier or in the vertical interval of the video signal. However, such in band communications further complicate data reception at interdiction apparatus 130, 130' and are desirably eliminated.

Consequently, the headend 100, cable television serving cables or trunks 110, feeder lines 112, drop lines 115, interdiction apparatus 130, 130', and television receivers 170 at a typical subscriber premises 181, 182, and 183 comprise a typical off-premises' cable television interdiction system. Channel program or authorization data is transmitted via the addressable data transmitter 103 over one of the trunks 110 to one of the feeder lines 112. At a pole 120, the serving signal is dropped via one of the drops 115 to a subscriber location. Drop 115 is connected by a conventional connection to a television receiver 170. The provided television receiver may be a conventional television receiver 170 or may be a so-called cable ready television receiver.

In accordance with a cable television system provided with off-premises interdiction apparatus 130, a housing is mounted on a strand supporting the feeder cable 112 to a pole 120 or in a similar manner. Inside the housing of interdiction apparatus 130 is common circuitry for tapping into the broadband television and data transmission spectrum. Referring to the first pole 120 from the left of FIG. 1, there is shown a strand mounted apparatus serving two drops 115 to subscribers. Altogether, four subscribers and up to four drops 115 may be served by the off-premises interdiction apparatus 130. Besides the common circuitry, up to four (or more) plug-in interdiction control modules may be provided in one housing. Also, if desired, additional services may be provided via other plug-in units in the housing such as impulse pay-per-view, subscriber polling involving two-way data communications, meter reading, energy management or other services. A detailed discussion of providing a cable television reverse path for such services is provided in application Ser. No. 07/446,695 entitled "CATV Reverse Path Manifold System," filed Dec. 6, 1989, now U.S. Pat. No. 5,109,286.

Desirably, all equipment may be removed from the subscriber premises. However, for the provision of additional services, some on premises equipment (not shown) may be unavoidable. For purposes of this description, however, premises 181, 182 and 183 will be assumed to include at least one conventional television receiver 170 Power for interdiction apparatus 130, 130', may be provided over the trunk 110 and feeder 112 from the headend 100 or be provided via the subscriber drop 115, or by a combination of such means. Alternatively, power may be even provided by means such as solar cells or other external sources, or by internal sources such as batteries. Interdiction apparatus 130, 130', may be secured in a tamper resistant housing or otherwise secured such as in a locked equipment closet of an apartment complex. If located in a place exposed to the elements, the housing should additionally be weather resistant and water-tight. Also, the housing should be designed to preclude radio frequency leakage.

Interdiction apparatus 130, 130' are uniquely addressable by headend 100. If two bits of a plural bit unique subscriber address are associated with uniquely identifying one plug-in slot for one of four interdiction control modules, common control circuitry may be uniquely addressed with remaining address data not used to secure the data communication. Just as premium programming is transmitted in the clear and since no data communication is necessarily required with a subscriber premises, a subscriber address need not be transmitted in a secure form.

Interdiction apparatus 130 comprises addressable common circuitry and up to four or more plug-in interdiction control modules. Upon receipt of subscriber specific premium program or channel authorization data, the data are stored in a nonvolatile memory at the interdiction apparatus 130. Channel interdiction circuitry associated with each interdiction control module jams unauthorized premium programming dropped via a particular drop 115 to a particular subscriber. Consequently, interdiction apparatus 130 is reasonably compatible with addressable authorization data transmission known in the art.

In this system no scrambling of the premium channels (and no resulting artifacts) is necessary or desirable. Furthermore, no additional forms of service security are necessary such as channel encryption, in-band channel or tier verification or other security measures. The would-be service pirate must attempt to remove a particular pseudo-randomly timed jamming signal placed at a varying frequency, seek to tamper with the off-premises apparatus 130, or derive a signal from shielded and bonded cable 112 which should likewise be maintained secure from radio frequency leakage.

Figure 2:
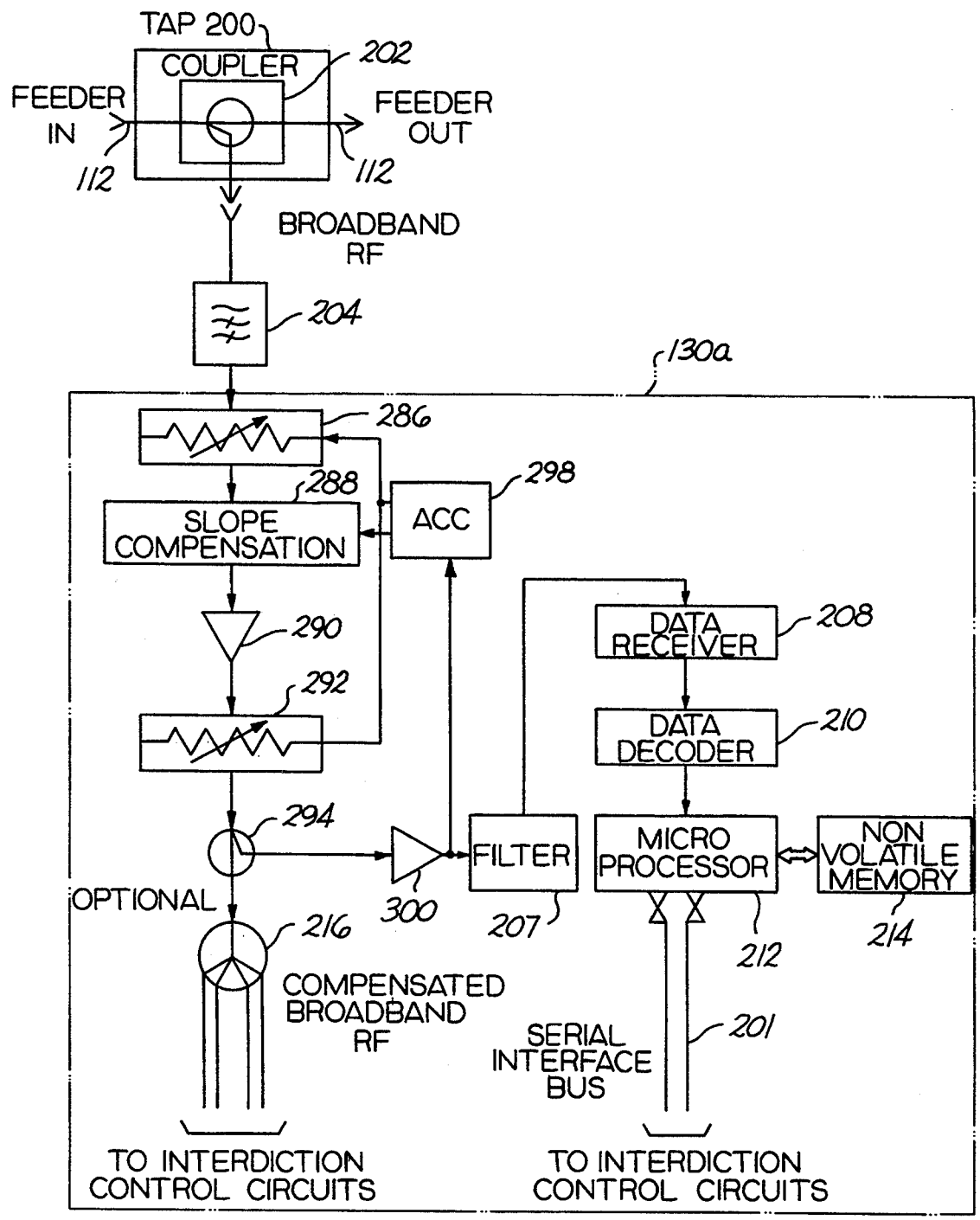
FIG. 2 is a detailed block diagram of the interdiction apparatus illustrated in FIG. 1 which includes the automatic compensation control.
Figure 3:
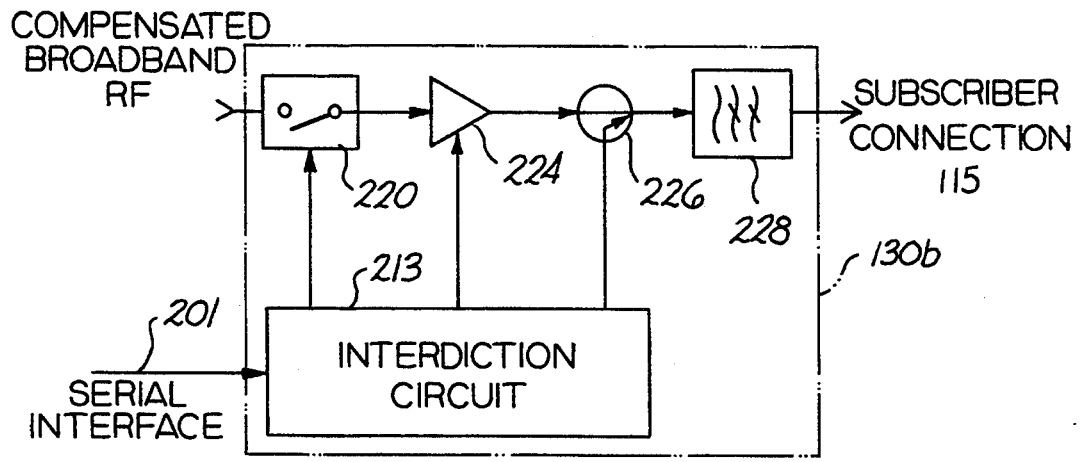
FIG. 3 is a detailed block diagram of an interdiction control circuit for the interdiction apparatus illustrated in FIG. 2.

The common circuitry 130a of interdiction apparatus 130 will now be described by means of the block diagram FIG. 2. For serving at least one, and up to four or more subscribers interdiction control modules 130b in accordance with the block diagram FIG. 3 are provided. Referring particularly to FIG. 2, the feeder cable 112 is shown entering interdiction apparatus 130 at FEEDER IN and leaving at FEEDER OUT.

At a tap 200, a directional coupler 202, which may be in the form of a plug-in module, taps into the broadband serving feeder cable 112. A broadband spectrum of CATV radio frequency signals is thus output to highpass filter 204. Highpass filter 204 passes a band of frequencies comprising at least the data carrier frequency or frequencies (in a bi-directional application) and the CATV channel spectrum. The CATV spectrum presently comprises a frequency band from about 54 MHz. to 550 MHz. which may be extended in the future.

The off-premises common circuitry 130a of FIG. 2 can be located at, or proximately located to, the interdiction control units 130b, which will be further described in connection with FIG. 3, but are usually contained in the same housing. An automatic compensation control circuit as disclosed in FIG. 2 comprises a variable gain device 286, slope compensation network 288, RF amplifier 290, variable gain device 292, directional coupler 294, amplifier 300, and an automatic compensation control 298. The automatic compensation control 298 includes an automatic gain control (AGC) which varies the amplitude of the broadband television signal by controlling the attenuation of variable gain devices 286, 292 and an automatic slope control (ASC) which varies the amplitude of the broadband television signal with respect to frequency by controlling the slope compensation network 288.

The automatic gain control of AGC 298 appropriately regulates the broadband RF signal power to fall within established limits. The AGC control provides a common gain control for regulating the amplitude of the broadband of picture carrier signals received by all subscriber units. According to the parent application U.S. Ser. No. 446,603, the incoming broadband picture carrier is regulated at this common point to fall within a range which is 31 2.5 dB to +6.5 dB from the jamming carrier but, as importantly, is fixed at a predetermined level so as to deliver a constant power level to the subscribers served. The predetermined reference level to which the incoming picture carrier is adjusted is set relative to the jamming carrier level so as to cause adequate interdiction without causing artifacts on the clear channels.

Referring again briefly to FIG. 1 and particularly to premises 181 a minimum signal level of 0 dBmv at the subscriber premises is required under Federal Communications Commission regulations. Considering a nominal drop line 115 the predetermined reference level of the picture carrier may be set at +3 dBmv and the predetermined jamming level should be set at the interdiction control units of FIG. 3 ideally at about +0.5 to +9.5 dBmv, or nominally at +5.5 dBmv. Of course, if the drops are exceptionally short, for example, as are involved in residential subdivisions, apartment complexes, townhouse developments and the like, the predetermined picture carrier level and jamming carrier level may be adjusted accordingly.

Also connected to directional coupler 294 and amplifier 300 is a filter 207 and a data receiver 208 for receiving data from the addressable data transmitter 103 located at headend 100. Data receiver 208 receives the data transmitted, for example, over a data carrier of 108.2 megahertz and provides unprocessed data to a data decoder 210. In accordance with an established protocol, such data may be in the form of an operation code, a subscriber unique address and associated data. Data decoder 210 processes the data and provides the separately transmitted data to microprocessor 212 for further interpretation in accordance with a built-in algorithm. Microprocessor 212 is most efficiently chosen to alleviate as many responsibilities from any other microprocessor provided for an individual interdiction control module 130b. Preferably, microprocessor 212 is an eight bit microprocessor having eight kilobytes of internal code such as a Motorola 68HC05C8.

Received data may be stored in nonvolatile memory 214 by microprocessor 212. Data may be temporarily stored in memory 214 or more permanently stored and subsequently downloaded when needed to a interdiction control module via a serial interface bus connecting microprocessor 212 with the separate microprocessors associated with each provided interdiction control module.

Variable gain devices 286 and 292 regulate the received broadband of picture carriers to the above-described reference level while the microprocessor 212 controls the jamming carrier level outputs of associated interdiction control units 130b within the prescribed range.

Microprocessor 212 consequently interprets both global communications addressed to common control circuitry such as a command to set automatic gain control-reference levels or communications addressed to unique interdiction control units 130b, or both. If appropriate, microprocessor 212 ignores global or addressed communications to other interdiction apparatus 130. Examples of global communications peculiar to interdiction apparatus 130 are premium channel frequency data and jamming factor data for each premium channel or channel over which premium programming at a particular point in time is provided via headend 100. Examples of addressed communications include communications comprising premium channel or programming authorization information or communications instructing the common control circuitry to deny or provide service to a particular subscriber.

If two way communications over the serving cable are anticipated, a data transmitter (not shown) may be provided in the common circuitry of FIG. 2 or a separate telephone link from the subscriber location to the headend may be provided. Serial interface bus 201 may be a two way communications link by way of which microprocessors associated with interdiction control modules 103b may, at least, provide status reports to microprocessor 212 upon inquiry.

Radio frequency splitter 2 16 provides the compensated broadband radio frequency signals comprising at least the cable television spectrum separately to each interdiction control module 130b that is provided If a reverse path is required for special additional services, a signal combiner (not shown) of a plug-in special service module (not shown) may be provided for receiving communications from each of the provided interdiction control modules 130b and transmitting them in an opposite manner to RF splitter 216. Certain data may be transmitted back toward the headend 100 via the special service plug-in module associated with the additional special service.

Jamming signals are introduced by the interdiction control modules 130b at a level approximately within a range of −2.5 db to +6.5 db or +2 dB nominal of the video picture carrier power level of the unauthorized premium channel frequency to be jammed. They are most conveniently introduced for video carrier jamming approximately within a range of frequencies extending from just below the video carrier to +250 kilohertz above the video carrier toward the audio carrier of the channel to be jammed. The frequency is selectable by the headend 100 and so may be chosen to jam the audio carrier at a frequency closer to that carrier if desired. Also, the power level of the jamming signal may be selected from the headend 100 as well. Both the power level and frequency of the jamming signal may be intentionally varied via global data transmissions if, for example, audio carrier jamming is desired. Such interdiction on a per channel basis between the video and audio carriers minimizes adjacent channel artifacts. A further discussion of the selecting the amplitude and the frequency of a jamming carrier is found in U.S. application Ser. No. 07/446,602 entitled "Optimum Amplitude and Frequency of Jamming Carrier in Interdiction Program Denial System", filed Dec. 6, 1989, now U.S. Pat. No. 5,142,574.

With respect now to FIG. 3 there is illustrated one of the interdiction control units 130b. The interdiction control unit 130b includes an interdiction circuit 213 including a microprocessor and one or more frequency agile jamming oscillators. A preferred implementation of this circuit is more fully illustrated in FIG. 3 of the previously referenced West, et al. patent. A serial interface 201 connects the interdiction control unit to the microprocessor 212 of the common circuitry 130a. The interdiction control unit 130b further receives the compensated broadband RF television signal directly from the directional coupler 294, or optionally from one of the fan out lines from the coupler 216. After compensation, the broadband television signal flows through a number of controlled elements 220, 224, and 226, and then to a highpass filter 228 before being provided to the subscriber drop line 115.

The controlled element 220 is a subscriber disconnect switch which is controlled by the interdiction circuit 213. In response to data received by microprocessor 212 and commands to interdiction circuit 213, the switch of element 220 is opened preventing any programing from being connected to the premises of the subscriber or closed providing authorized service. The final gain control element in the subscriber connection is the amplifier 224 which provides a fixed gain to the broadband signal to provide a standard level of output. A directional coupler 226 is provided to allow interdiction of premium channels by combining them with jamming signals from the interdiction circuit 213.

Figure 7:
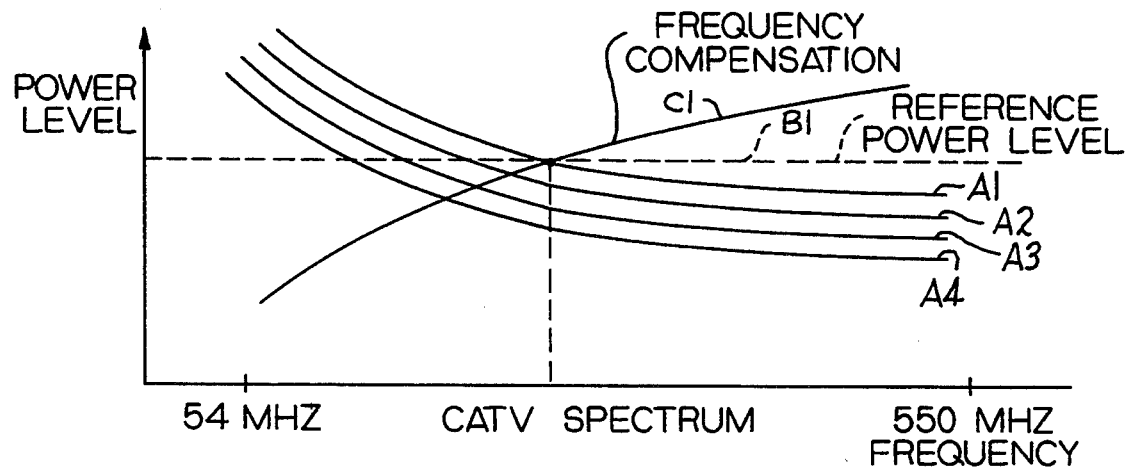
FIG. 7 is a pictorial diagram of the CATV spectrum illustrating the attenuation of a broadband television signal because of the cable plant.

The automatic compensation control is meant to correct the broadband RF television signal for two parameters caused by cable plant and installation variations. The first is overall signal level caused by attenuation due to installation location, temperature, and aging components, etc. The second is flatness or slope caused by the differential attenuation of the different frequencies of the CATV spectrum in the cable plant. Curves A1–A4 of FIG. 7 illustrate the power level of an uncompensated CATV spectrum which has been passed through a distribution cable plant where the power levels of the frequencies have been attenuated irregularly. Generally, the power levels of the higher frequencies are attenuated more than the lower frequencies. The spectrum is a family of curves A1–A4 because the overall level of the actual curve is dependent upon the distance of the installation from the source, such as the headend, trunk amplifier, line extender, etc., the temperature, and the aging of the components. For example, curve A1 would be for locations closer to a source or for cooler temperatures. An increase in temperature or distance from a source, and sometimes the aging of components, increases the impedance attenuation of the cable plant and shifts the curves downward toward curve A4.

The function of the automatic gain control is to shift the actual spectrum curve at the installation, whether curve A1–A4 to a reference power level. The automatic slope control is then called upon to provide frequency dependent amplitude adjustment to flatten out the response curve over the CATV spectrum. Ideally, a frequency compensation function such as curve C1, when applied to an actual characteristic after AGC adjustment, such as curve A2, would produce a flat response over the CATV spectrum at the reference power level.

In actual practice, actual curves A1–A4 are not as well behaved as shown because of variations in the gain and tilt compensation in the trunk amplifiers and the line extender amplifier, and other considerations. Therefore, the actual response curves are more complex and may illustrate positive slopes, or even maxima and minima points. The automatic gain control should be flexible enough to attenuate or amplify to account for these situations and the automatic slope control should be flexible enough to provide various slopes, either positive or negative, depending upon the actual conditions at the interdiction apparatus installation. Moreover, the automatic gain control and automatic slope control should work in concert with each other to provide optimal compensation to the broadband IF television signal.

Figure 4:
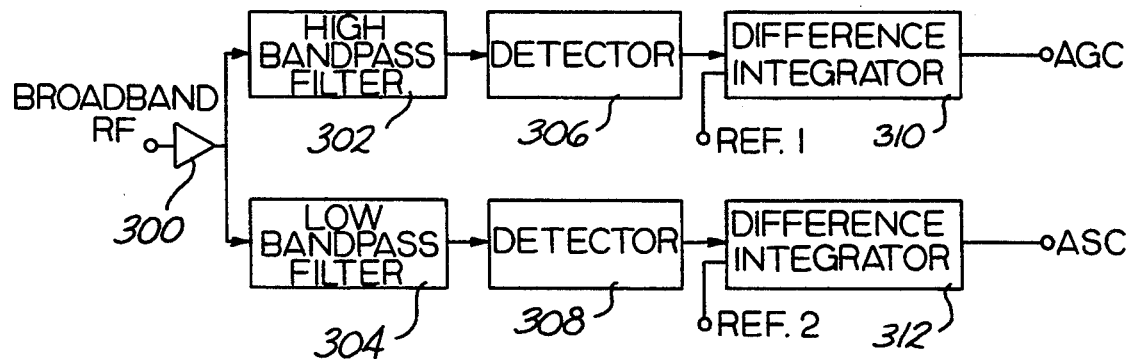
FIG. 4 is a detailed block diagram of a first embodiment of the automatic compensation control illustrated in FIG. 1.

A detailed block diagram of the automatic compensation control 298 including AGC and ASC comprising a first embodiment of the invention is illustrated in FIG. 4. A portion of the broadband RF television signal, as split by directional coupler 294 enters a control loop through a linear amplifier 300. One branch of the control loop is comprised of a high bandpass filter 302, an RF detector 306, and a difference integrator 310. This leg of the control loop performs the automatic gain control function. The broadband signal enters the high bandpass filter 302 and a portion of the CATV spectrum comprising those frequencies from 250 MHz. to 310 MHz. are selectively passed to the RF detector 306. The RF detector 306 performs a power averaging function for that portion of the band of the CATV spectrum filtered by the high bandpass filter 302. This average power level is compared to a reference power level REF 1, in the difference integrator 310 and the error between them is integrated to provide the signal AGC. The AGC signal controls the variable gain devices 286 and 292 (FIG. 2) in a direction to null or minimize the difference. The loop acts as a closed loop feedback control which generates a controlled power level (the reference level) from the output of coupler 294.

The second loop, which again begins at the output of the amplifier 300, controls the slope compensation network 288 (FIG. 2). The automatic slope control comprises a low bandpass filter 304 which filters a band of frequencies from 54 MHz. to 150 MHz. from the broadband RF television signal. An RF level detector 308 then detects the average power level of this low band of frequencies and outputs its signal to a difference integrator 312. The difference integrator 312 compares the average power level of the low band of frequencies to a reference power level, REF and integrates this difference. The difference integrator 312 outputs the automatic slope control signal, ASC, as the difference between these two signals and in a sense to minimize that difference by controlling the slope compensation network 288.

Figure 5:
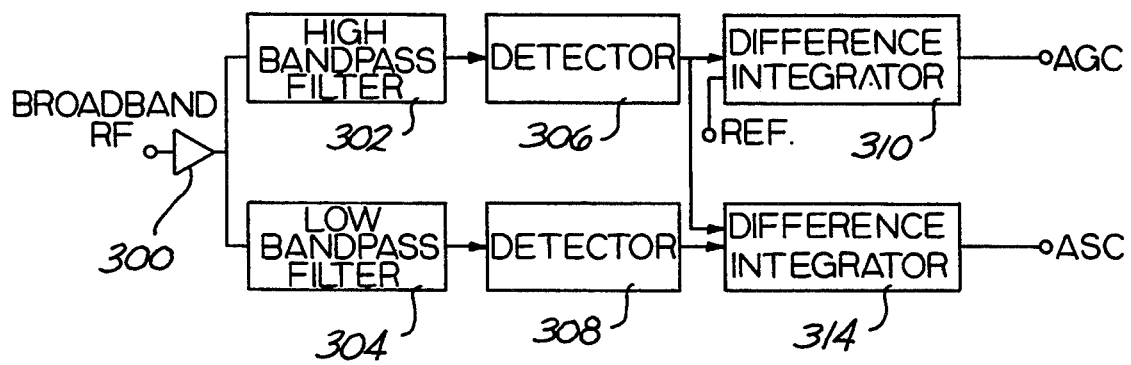
FIG. 5 is a detailed block diagram of a second embodiment of the automatic compensation control illustrated in FIG. 1.

In a second preferred embodiment, as shown in FIG. 5, the broadband RF television signal from the output of the directional coupler 294 is amplified in the amplifier 300 and detected in a similar manner through high bandpass filter 302 and detector 306 for the automatic gain control loop, and low bandpass filter 304 and detector 308 for the automatic slope control loop. The automatic gain control loop is performed in a similar manner by the difference integrator 310, by integrating the error between the output of detector 306 and the reference, REF 1. The difference integrator 314 in the automatic slope control loop however, integrates the error between the output of detector 306 and the output of detector 308.

Now the design of an appropriate bandpass filter for the automatic gain control and automatic slope control will be discussed in greater detail. It is known from the art of design of the cable distribution plant to design a filter of a cable distribution amplifier to select a single channel to use as a gain control channel to be sampled. In such a cable distribution application, one channel is designated a pilot channel and the filter is designed to pass this channel and stop all others. The CATV system operator, however, is constrained and must exercise diligence to ensure that a signal is always present on the pilot channel. Due to differences in the way different CATV systems are operated, the same channel cannot be used universally. Typically, the filter then is designed as an exchangeable plug-in module which is installed with the distribution amplifier.

Specifying only a single channel for filters 302 and 304 would present the same and related difficulties as using a single pilot channel in the design of distribution amplifiers. It was desirable to reduce costs and improve manufacturing efficiency which problem was solved by investigating the feasibility of providing a contiguous band of picture carriers and an appropriately designed filter for passing such a band for the automatic gain control and automatic slope control.

In accordance with the present invention, it was not necessary to manufacture and provide a plurality of filters, one for each possible pilot carrier. Furthermore, in most cable distribution plants, the pilot channels chosen for regulating the automatic gain control circuits of distribution amplifiers are not necessarily the same channels as those protected in an interdiction or the jamming system or those which might be appropriate for automatic slope control.

Consequently, according to the principles of the present invention, bandpass filters 302 and 304 are each designed as fixed (not interchangeable), simple, low cost filters encompassing a plurality of channels. Furthermore under these conditions, more than adequate gain control and slope control characteristics result because, even though a particular channel within the contiguous band may or may not be present, it has been statistically determined that adding a number N of channels together greater than or equal to two still permits acceptable performance. The cable operator then is free to add or remove a subset of the channels of the band and yet have a minimal effect on the automatic gain control characteristics and performance.

Figure 6:
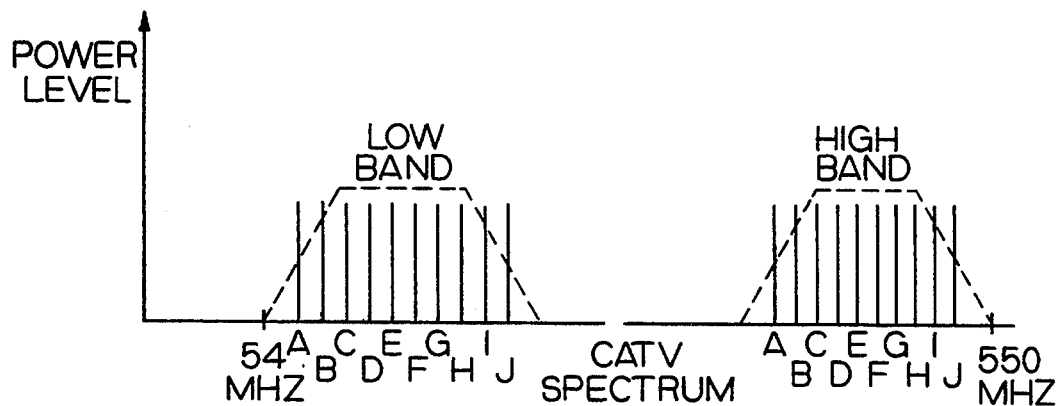
FIG. 6 is a pictorial diagram of the CATV spectrum illustrating the filtered bands of frequencies for the high bandpass filter and the low bandpass filter.

An exemplary band of contiguous picture carrier frequencies is shown in FIG. 6. The figure shows N equal to 10 total channels for illustration purposes, but the technique is understood to apply to a plurality of channels, greater than or equal to two, which could include any reasonable number of channels. Channel designations A-J shown in FIG. 6 are for illustrative purposes only and should not be construed as being the channels so designated traditionally in the CATV industry. The filter characteristic of FIG. 6 is shown to encompass eight channels totally, channels B, C, D, E, F, G, H, I, and has partial response at two other channels, A and J. In this example, the eight totally encompassed channels contribute equally to the ultimate signal level measured at the detectors 306, 308. Channels A and J provide a contribution to the signal level detected, but to a lesser extent than middle channels B, C, D, E, F, G, H, and I.

With a filter having a passband as shown, more than acceptable performance results so long as at least one of the totally encompassed channels has a signal present, and there need be no concern if there is no signal on a selected subset of totally encompassed channels or on the partially responsive channels. As more channels are removed, performance of the associated control circuits deteriorates gradually in proportion to the percentage of the channels removed. In regard to the partially responsive channels A and J, the filter may be designed such that the combined signal strength is equivalent to one totally encompassed channel. Thus, while none of the totally encompassed channels may have signal, there may be sufficient signal from the sum of the two channels A and J to adequately operate the automatic gain control circuit of the present invention. Also, the roll-off characteristic of the filter may spill over into other channels below and above channels A and E respectively such that there may be some limited contribution to a detected power level from these channels and the cost of the filter may be minimized.

Thus, a filter may be designed which encompasses a large number of channels commonly used by CATV system operators. The CATV system operator may employ this system without regard to whether or not each of the channels is being used to provide signal. Furthermore, the system operator may, in fact, remove one or more of the channels from service at times, without concern for upsetting the operation of the system.

While the width of the bandpass filters can be substantially any range of frequencies of the CATV spectrum, there are advantages to reasonably limiting the width of these filters. Initially, because the RF detectors average the power over the width of the filter, the narrower the filter, the more precise the measurement of the actual operation point. Further, just as very narrow bandwidth filters are expensive, so are very wide bandwidth filers. If the filters are too narrow, the cable operator would have to ensure at least one pilot frequency remains operating within its range.

To preclude the necessity of a predetermined pilot frequency and to make the measurement reasonably precise at a reasonable cost, the system uses bandpass filters, for both the high and the low bands, which are approximately 60 MHz. wide, i.e., 10 standard NTSC channels. The rolloffs of the filters are designed to include approximately 50% of the adjacent lower and adjacent higher channels.

Figure 8:
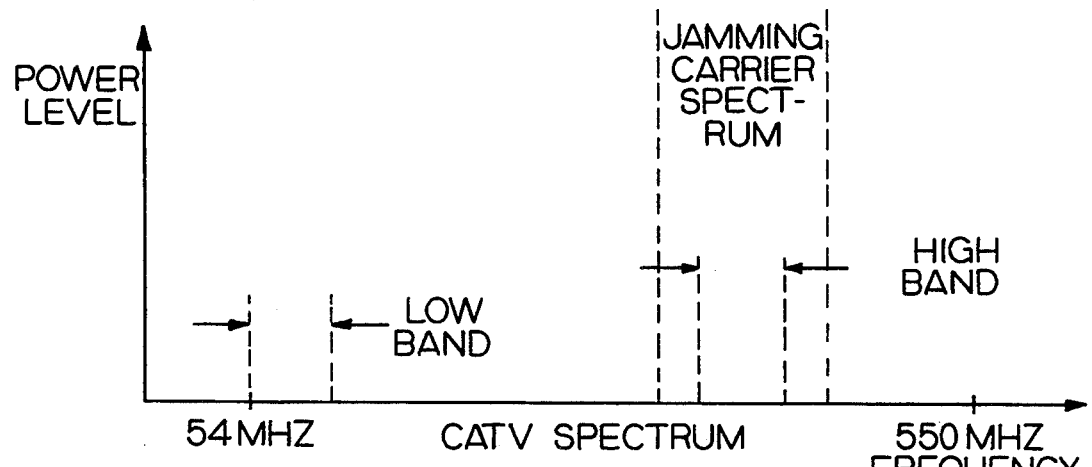
FIG. 8 is a pictorial diagram of the CATV spectrum illustrating a preferred positioning of the high band and low band filters for the automatic compensation control of the invention.

The placement of the high band and low band in the CATV spectrum will now be discussed with reference to FIG. 8. The figure illustrates the CATV spectrum overlaid with the jamming frequency spectrum from the off-premises CATV system of West, et al. Because one of the goals of the automatic compensation control is to provide a reference level for the CATV spectrum which is related to the jamming carrier levels, it is important to provide more precise gain control in those ranges. Therefore, at least one of the detected bands should be related to the jamming carrier frequencies and that band should be used to regulate the automatic gain control. The figure illustrates a preferred implementation of the invention when used in conjunction with the off-premises CATV system illustrated in West, et al. For a number of reasons, the jamming carrier spectrum of the system is located from approximately 120 MHz. to 430 MHz.

To provide sufficient spacing between the low band and the high band and to precisely control the reference power level with respect to the jamming carrier power levels, the high band is chosen to include all or part of the jamming carrier spectrum. Preferably, the high band is a range of approximately 60 MHz. wide centered in the jamming channel carrier spectrum. The low band of frequencies is similarly a range of channels approximately 60 MHz. wide spaced away from the high band and located in the lower frequencies of the CATV spectrum.

Figure 9:
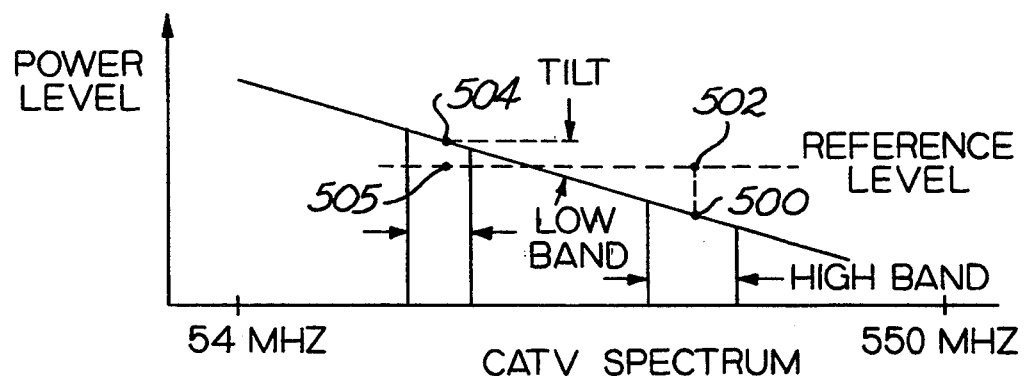
FIG. 9 is a pictorial diagram of the CATV spectrum illustrating the operation of a first embodiment of the automatic compensation control illustrated in FIG. 1.

FIG. 9 illustrates the operation of the first implementation of the automatic compensation control. In essence, the power level at point 500 is measured and compared against the reference power level at point 502. The difference is then nulled to compensate the broadband television signal for an actual power level over or under the reference level. Likewise, the power level at point 504 is measured against the second reference power level at point 505. This could be the first power level, but not necessarily. The difference is then nulled in the loop to compensate the broadband television signal for frequency dependent deviations above or below the reference level at 505. However, these loops are coupled together because the tilt compensation loop assumes that the broadband signal level is at the reference level and the gain compensation loop assumes the broadband signal is flat. Of course, neither case is true and the loops must hunt more than is necessary because their base assumption keeps moving being blindly driven by the other loop. In the worst case, the two loops could be working against each other where the slope compensation control corrects tilt induced by movement of the automatic gain control in a direction opposite to actual tilt, and vice versa. While the loops can be made to settle, such as by putting in deadbands or by setting authority levels or delay constants, where one loop will limit until the other completes its correction, this incurs the penalty of additional circuitry and more complex circuits.

Figure 10:
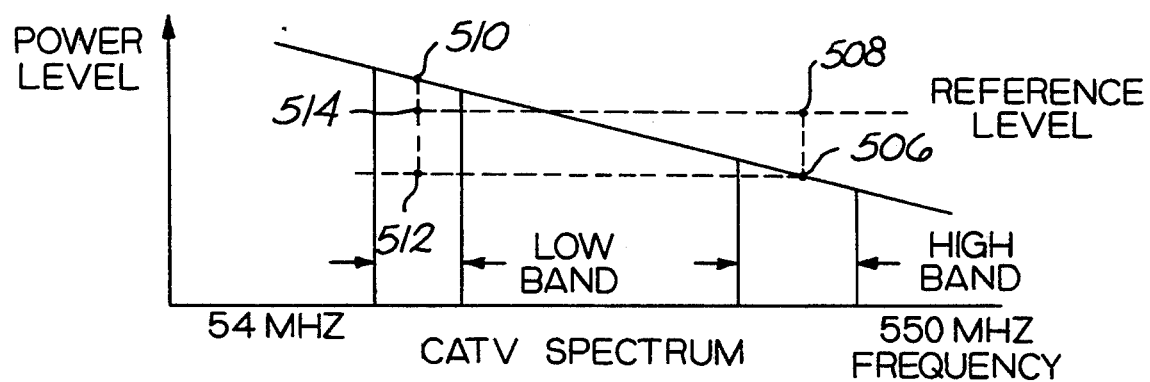
FIG. 10 is a pictorial diagram of the CATV spectrum illustrating the operation of a second embodiment of the automatic compensation control illustrated in FIG. 1.

The second implementation whose operation is illustrated in FIG. 10 is a method for uncoupling the two control loops by using a moving reference for the slope compensation control. The moving reference is developed by taking the difference between the actual average power level at the high band and the actual power level at the low band. The moving reference is used for the automatic slope control because the overall reference picture carrier level is the output of the automatic gain control and set by other criteria mentioned earlier. In this implementation, as actual point 506 moves toward reference point 508 under control of the automatic gain control loop. This information is coupled back to the automatic slope control through the differencing process. The difference between actual point 510 for the slope control and actual point 512 is not as great in absolute terms as that which was measured for the first embodiment. Further, this difference is more indicative of the final direction of the slope correction and becomes more so the closer it moves to the reference level at 514. This uncoupling of the loops allows both to act smoothly together to compensate overall amplitude level and frequency dependence.

Figure 11:
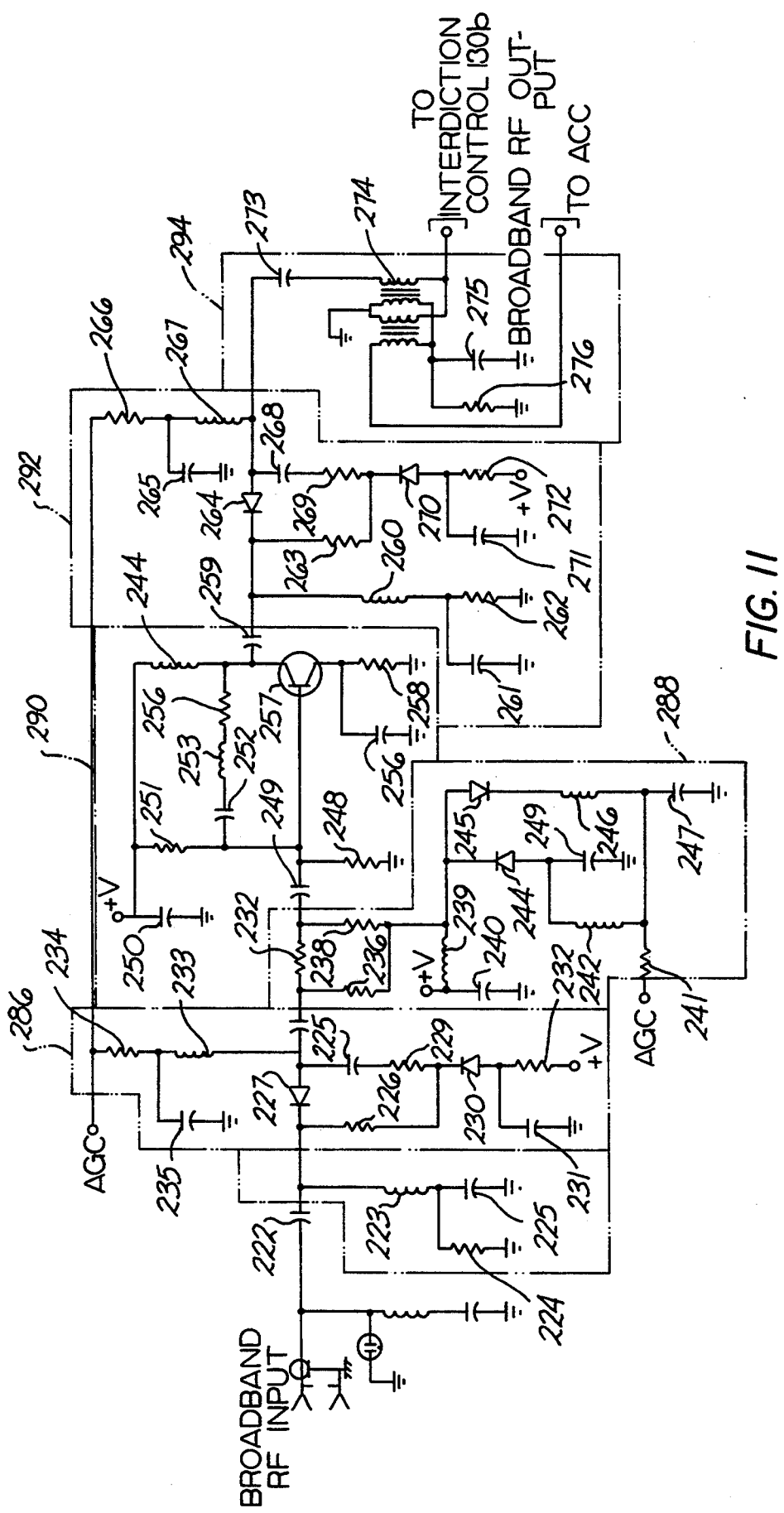
FIG. 11 is a detailed schematic diagram of the variable gain and frequency devices of the automatic compensation control as illustrated in FIG. 2.

FIG. 11 is a detailed schematic circuit of the variable gain device 286, the slope compensation network 288, the amplifier 290, the variable gain device 292, and the directional coupler 294. Input to the circuit is the broadband RF television signal from the filter 204 and the output is to the interdiction control unit 130*b*, possibly through the optional fan out coupler 216. The broadband RF television signal is coupled to the first variable gain device 286 through capacitor 222.

The variable gain device 286 comprises a voltage controlled network which changes its attenuation characteristic based on the control voltage signal AGC. The variable gain device comprises resistor 234 and RF stopping circuit with capacitor 235 and inductor 233. This network is connected to the parallel combination of a resistor 226 in one leg and a capacitor 225 and resistor 229 in the other leg. A diode 227 is placed for conduction between the capacitor 225 and the resistor 226. At the other terminal of the parallel connection, a diode 230 is connected by its cathode. Connected to the anode of the diode 230 is the parallel combination of a capacitor 231 and a resistor 232 which have their other terminals connected between ground and a positive voltage +V, respectively.

In operation, the variable gain device 286 provides a valuable amount of attenuation according to the AGC voltage applied to resistor 234. The diodes used at 227 and 230 are generally of the type known as "PIN" diodes, which have a resistance proportional to the DC current through them. The voltage, +V, applied to resistor 232 is constant and of the range of AGC voltages. As the AGC voltage increases, more current is developed through diode 227 which causes it impedance to RF energy from capacitor 222. This allows more of the CATV spectrum to pass to the output of the device. As current through diode 227 increases, the current through diode 230 decreases, reducing the amount of RF conducted to ground through resistor 226, and 229. Thus, as the AGC voltage increases, the attenuation of attenuator 286 decreases, by virtue of more signal being able to flow through series diode 227, and less signal flowing through shunt diode 230.

In a similar manner, an identical network comprising elements 262-272 forms the variable gain device 292. The variable gain device 292 operates in the manner previously described for the variable gain device 286 by having the AGC signal applied to the input resistor 266. The broadband RF television signal is coupled from the first variable gain device 286 to the second variable gain device 292 through coupling capacitors 249 and 259 which include there between the slope compensation network and the amplifier 290.

The amplifier 290 comprises a NPN transistor 257 which is configured as a linear amplifier having biasing resistors 251 and 248 connected between the source +V and ground. The junction of the resistors 251 and 248 is connected to the base of the transistor 257 to provide an input signal. A load inductor 244 is connected between the voltage source +V and the collector of the transistor while emitter biasing resistor 258 is connected between the emitter and ground. A bypass capacitor 256 is further connected between the emitter of the transistor 257 and ground. To linearize the gain of the amplifier over the CATV spectrum, a series frequency compensation network comprising capacitor 252, inductor 253, and resistor 256 is connected between the collector and base of the transistor 257. A high frequency decoupling capacitor 250 is connected between the source +V and ground.

The output of the variable gain device 292 is supplied to the directional coupler 294 through a coupling capacitor 273. Substantially all of the compensated broadband RF CATV signal exits the coupler to the interdiction control unit 130B through the primary of a coupling transformer 274. A small portion of the broadband RF signal representative of the power level of the compensated signal is taken off through the secondary of the transformer 274 to provide a feedback signal to the automatic gain control and to the automatic slope control. Frequency compensation for the directional coupler is provided by the resistor 276 and the capacitor 275 connected to the common terminals of the secondary of the transformer 274.

The slope compensation network 288 comprises a resistor 232 connected in series between the coupling capacitor and the coupling capacitor 249. A combination of resistor 236 and 238 form part of the tilt network with a common node connected to diodes 244 and 245. A DC bias level is provided to the node via an inductor 239 which has it other terminal connected to the source +V. A decoupling capacitor 240 is further connected between the source +V and ground. One control leg of the slope compensation network comprises a parallel tuned circuit of inductor 242 and capacitor 243 connected through diode 244 to the control node. The other control leg of the slope compensation network 288 comprises a series tuned circuit of inductor 246 and capacitor 247 connected to the control node through diode 245.

The control signal voltage from the automatic slope control, ASC, is applied to the control legs through a resistor 241. Basically, the bias through inductor 239 provides a DC bias to the node from the voltage +V. The ASC signal provides a DC control level which controls the frequency sensitive legs in an opposite manner. For example, if the ASC signal is above the bias voltage, diode 244 will conduct and diode 245 will be blocked. If the automatic slope control voltage is below the bias voltage, then diode 244 will be blocked and diode 245 will conduct. By setting the bias voltage and the component values of each control leg the direction of the tilt correction (either positive or negative slope) and the amount of tilt (value of the slope) can be adjusted.

Figure 12:
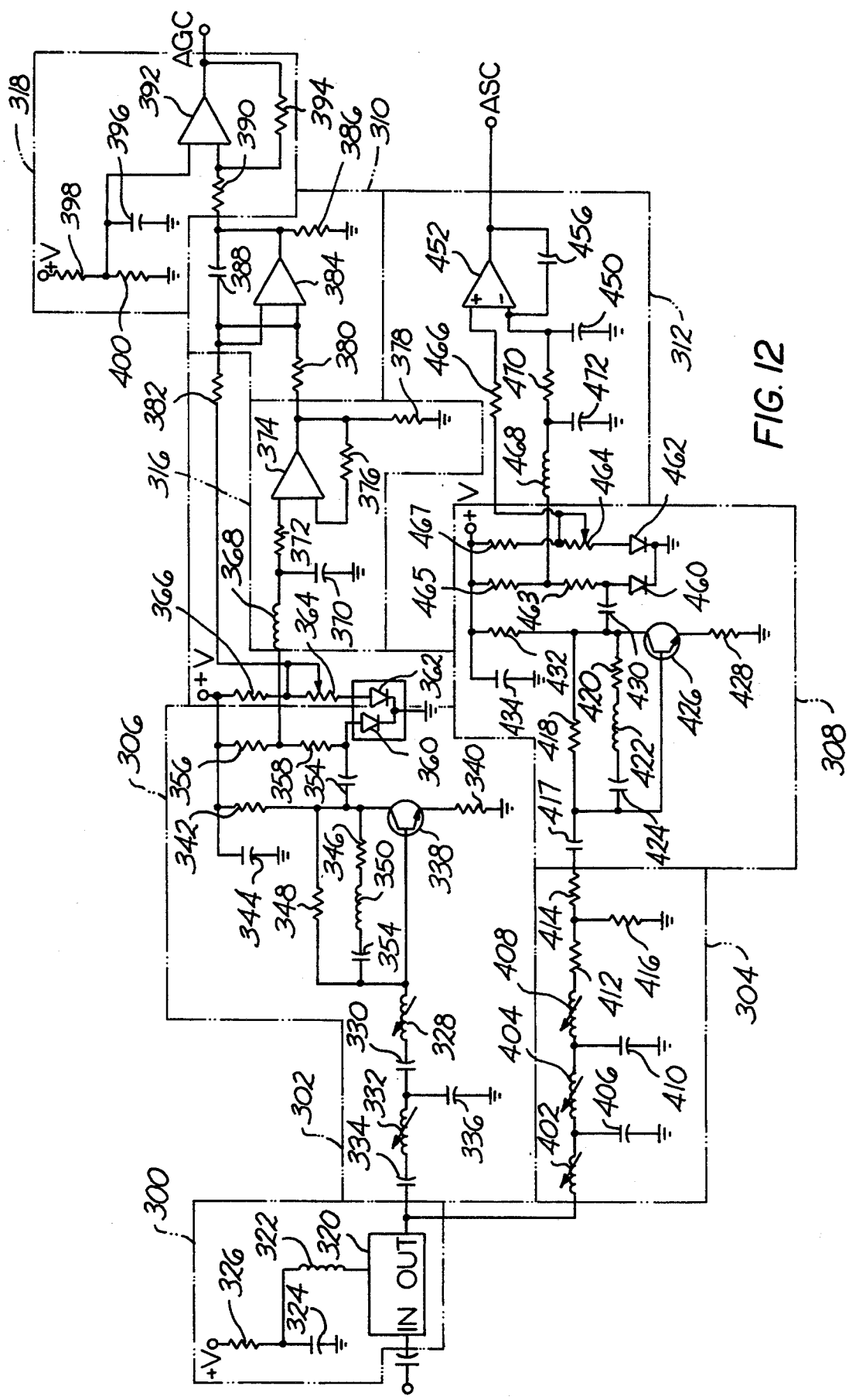
FIG. 12 is a detailed schematic diagram of a first embodiment of the automatic compensation control as illustrated in FIG. 2.

FIG. 12 is a detailed schematic diagram of the first embodiment of the automatic gain control and automatic slope control illustrated in the block diagram of FIG. 5. The amplifier 300 is provided by an integrated circuit amplifier 320 with a decoupling network including inductor 322 capacitor 324 and resistor 326. After amplification the signal enters either the high bandpass filer or the low bandpass filter.

The high bandpass filter 302 is formed as a T connected LC network having inductor 328, 332 and capacitors 330, 334, and 336. The filter 302 feeds an amplification stage of the detector 306. The amplification stage comprises NPN transistor 338 with a collector resistor 342 connected to source +V and an emitter resistor 340 connected to ground. A feedback resistor 348 connected between the collector and base of transistor 338 sets the gain of the stage. A series network of resistor 346, inductor 350, and capacitor 352 flattens the response over the CATV spectrum. The output of the gain stage is capacitively coupled through a capacitor 354 to the anode of diode 360. The diode 360 is connected in a series path with resistor 356, 358 between the source +V and ground and rectifies the band of RF signals input thereby essentially detecting the average power level.

The voltage representing the detected power level is taken from the junction of resistor 356 and 358 and applied to a filter comprising inductor 368 and capacitor 370. After being filtered, the power level voltage is applied to a voltage follower 316. The voltage follower comprises operational amplifier 374 which has its output connected to ground through resistor 378 and connected to its inverting input through resistor 376. The power level signal is input through a resistor 372 connected to the noninverting input. The operational amplifier 374 provides isolation to maintain the voltage at the output resistor 378; the same as on the input resistor 372 substantially independent of output load.

The difference integrator 310 receives the power level voltage as one input to the inverting terminal of operational amplifier 384. The operational amplifier 384 is configured as an integrator by having an integrating capacitor 388, connected between its inverting input and output. The output of the operational amplifier 384 is additionally tied to ground through resistor 386. The noninverting input of the operational amplifier 384 receives a reference voltage through resistor 382. The reference voltage is developed from the wiper of a potentiometer connected in series with resistor 336 and diode 362 between the source +V and ground. The diode 362 provides temperature compensation to the reference voltage by changing its impedance with respect to temperature in a manner similar to that of diode 360. Because the reference voltage and the power level voltage are differenced in operational amplifier 384, the temperate variations on these voltages cancel.

The integrated error voltage is output as the AGC signal after being inverted and level shifted by an invertor and level shifter 318. The invertor and level shifter comprises operational amplifier 332 configured as an inverting amplifier with a reference offset. The gain is set by the ratio of resistors 394 and 390. The offset voltage is developed from a divider comprising resistor 398,400 connected between source +V and ground. The voltage of the junction of the resistor is filtered by a capacitor 396 and applied to the noninverting input of the operational amplifier 392.

The low bandpass filter 304 is a cascaded LC filter comprising inductor 402, 404 and 408 and capacitors 406 and 410. The last stage of the filter is a divider network comprising resistors 412,416 and 414. The output from the low bandpass filter is coupled by coupling capacitor 417 to an amplifier including NPN transistor 426. The detector 308 comprises the amplifier and a rectification diode 422 which receives the amplified band of frequencies through coupling capacitor 430. The amplifier comprising the transistor 426 and resistors 428, 432 and 418 as bias resistors operates in a similar manner to the amplifier of the detector 306. It has a similar compensation network including resistor 420, inductor 422 and capacitor 424.

The rectified voltage at the anode of diode 460 is taken off the unction of resistors 462, 464 and applied to the noninverting input of an operational amplifier 452. The operational amplifier 452 is configured as an integrating differential amplifier by connecting its noninverting input to its output through integrating capacitor 456. The input is through a filter comprising inductor 468, capacitor 472, resistor 470 and capacitor 450. The other input of the operational amplifier is through resistor 446 from the reference voltage developed at potentiometer 464. The output of the divider network is additionally applied to the noninverting input of the operational amplifier 452. The difference integrator 314 integrates the difference between the voltages input to resistor 466 and 470 to provide a control signal for the slope network which is the automatic slope control signal, ASC.

For this embodiment of the automatic compensation control, it is noted that the preferred implementation has the automatic gain control regulated by the high bandpass filter and the automatic slope control regulated by the output from the detector of low bandpass filter. The regulation of the automatic gain control by the high band of frequencies is advantageous because the system maintains a predetermined relationship between the broadband RF television signal and the jamming frequencies. The jamming frequencies are usually in the higher end of the CATV spectrum and thus this method will provide a better relative measure of the CATV signal versus the jamming carrier level in the band of interest. Moreover, it is advantageous to have the high band of frequencies centered around the middle of the jamming frequencies for the same reasons. Therefore, for an off-premises CATV system with a band of jamming frequencies from 120 MHz. to 450 MHz., the band of control frequencies from the high bandpass filter should be approximately 250 MHz. to 310 MHz.

Figure 13:
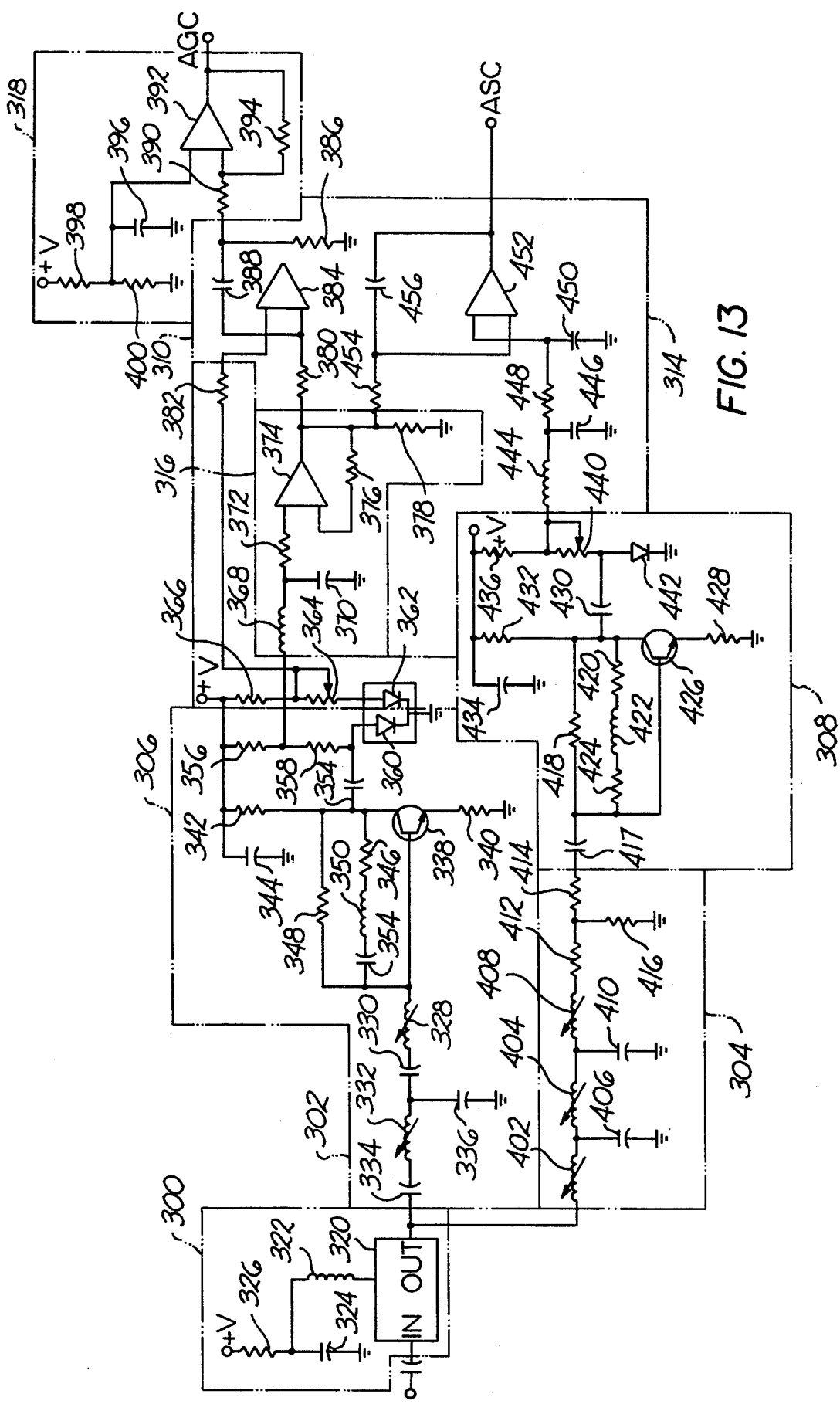
FIG. 13 is a detailed schematic diagram of a second embodiment of the automatic compensation control as illustrated in FIG. 2.

FIG. 13 is a detailed schematic diagram of the second embodiment of the automatic gain control and automatic slope control, illustrated in the block diagram of FIG. 5. The circuitry is similar to that of FIG. 12 for most of the controls. The difference integrator 314, however, is connected differently than the difference integrator 312 in the previous embodiment. As illustrated, one input to the operational amplifier 452 is from the output of the voltage follower 316 through resistor 454. The other input is from the potentiometer 440 which selects a portion of the output of the detector 308. Therefore, operational amplifier integrates the difference between the outputs of detectors 306 and 308 to produce the control signal AGC.

Interdiction or jamming of transmissions over alternative mediums to coaxial cable, such as fiber optic cable or over-the-air radio frequency transmissions, can easily be accomplished, especially for those fiber optic cable television arrangements operating over approximately the same RF television bands as conventional coaxial cable CATV distribution systems. In such instances, appropriate circuit changes, for example, changes of cable termination impedances and operating frequencies may be required.

While there has been shown and described the preferred embodiments of the inventions, it will be evident to those skilled in the art that various modifications may be made thereto without departing from the spirit and scope of the invention as set forth in the appended claims.

What is claimed is:

1. An automatic slope control apparatus for use in an interdiction cable television system which automatically corrects amplitude distortions as a function of frequency of a broadband television signal transmitted to a subscriber through a cable, the slope control apparatus comprising:

a variable impedance circuit responsive to a control input signal for adjusting the amplitude of the broadband television signal as a function of frequency;

a first bandpass filter for receiving the broadband television signal from the output of said variable impedance circuit and for outputting a first filtered portion thereof;

a first level detector for detecting the power level of the first filtered portion of the broadband television signal;

a second bandpass filter for receiving the broadband television signal from the output of said variable impedance circuit and for outputting a second filtered portion thereof;

a second level detector for detecting the power level of the second filtered portion of the broadband television signal;

an error amplifier for outputting said control input signal to said variable impedance circuit representative of the difference in power level between said first detected power level and said second detected power level.

2. The automatic slope control as set forth in claim 1 wherein said first filtered portion of the broadband television signal includes:

a contiguous band of at least two channels.

3. The automatic slope control as set forth in claim 2 wherein said contiguous band comprises:

a number N of such channels which are totally encompassed in the passband of said first bandpass filter and at least two channels which are partially encompassed, such that the elimination of a channel from a subset of the N channels will not significantly affect operation of the automatic slope control apparatus.

4. The automatic slope control as set forth in claim 3 wherein:

N equals 10.

5. The automatic slope control as set forth in claim 1 wherein said second filtered portion of the broadband television signal includes:

a contiguous band of at least two channels.

6. The automatic slope control as set forth in claim 5 wherein said contiguous band comprises:

a number N of such channels which are totally encompassed in the passband of said second bandpass filter and at least two channels which are partially encompassed, such that the elimination of a channel from a subset of the N channels will not significantly affect operation of the automatic slope control apparatus.

7. The automatic slope control as set forth in claim 6 wherein:

N equals 10.

8. The automatic slope control as set forth in claim 1 wherein:

said first bandpass filter includes the low part of the CATV band from 54 MHz. to 150 MHz.

9. The automatic slope control as set forth in claim 8 wherein:

said second bandpass filter includes the high part of the CATV band from 250 MHz. to 310 MHz.

10. An automatic compensation apparatus for use in an interdiction cable television system which automatically corrects the amplitude distortions as a function of frequency and the power level of a broadband television signal transmitted to a subscriber through a cable, the automatic compensation apparatus comprising:

a variable impedance circuit responsive to a first control input signal for adjusting the amplitude of the broadband television signal as a function of frequency;

a variable gain device responsive to a second control input signal for adjusting the power level of the broadband television signal to match a reference power level;

a first bandpass filter for receiving the broadband television signal from the output of variable gain device and for outputting a first filtered portion thereof;

a first level detector for detecting the power level of the first filtered portion of the broadband television signal;

a second bandpass filter for receiving the broadband television signal from the output of the variable impedance circuit and for outputting a second filtered portion thereof;

a second level detector for detecting the power level of the second filtered portion of the broadband television signal;

an error amplifier for outputting said first input signal to said variable impedance circuit representative of the difference in power levels between said first detected power level and said second detected power level; and an error amplifier for outputting said second control input signal to said variable gain device representative of the difference in power level between said first detected power level and a reference power level.

* * * * *